Nov. 21, 1967   D. L. PETTIT ETAL   3,354,356
CARTRIDGE-TYPE FUSE MOUNTING BLOCK AND MOUNTING THEREFOR
Filed Sept. 29, 1965

INVENTOR.
DORN L. PETTIT
HOWARD P. STOCK

Nov. 21, 1967          D. L. PETTIT ETAL          3,354,356
CARTRIDGE-TYPE FUSE MOUNTING BLOCK AND MOUNTING THEREFOR
Filed Sept. 29, 1965                                2 Sheets-Sheet 2

INVENTOR.
DORN L. PETTIT
HOWARD P. STOCK

United States Patent Office 3,354,356
Patented Nov. 21, 1967

3,354,356
CARTRIDGE-TYPE FUSE MOUNTING BLOCK AND MOUNTING THEREFOR
Dorn L. Pettit, Wauwatosa, Wis., and Howard P. Stock, Bellevue, Wash., assignors to Square D Company, Park Ridge, Ill., a corporation of Michigan
Filed Sept. 29, 1965, Ser. No. 491,182
6 Claims. (Cl. 317—116)

ABSTRACT OF THE DISCLOSURE

A fuse mounting block assembly which may be used with a plurality of different sizes of cartridge-type fuses including a pair of support members which may be reversibly positioned on a panel to either support a transformer on the panel and the mounting block on the transformer when the supports are in one position or the mounting block in spaced relation to the panel when the supports are in the other position so a smaller sized transformer can be positioned in the space between the mounting block and the panel.

---

The present invention relates to an assembly of electrical components and is more particularly concerned with a fuse block and mounting therefor which will permit the fuse block and a transformer to be mounted in the same area on a panel.

With minor exceptions, most electric codes require that each electric motor be provided with a separate manually operated switch. Additionally, because of convenience, accessibility and safety, many motor circuits are provided with magnetically operated switches, commonly known as motor starters, so the motor may be controlled by a push-button type switch at a location remote from the motor. While the foregoing requirement may be solved by providing separate enclosures for the manually operated switches and motor starters, it has been found that a single enclosure has many advantages as it requires less mounting space and provides a compact installation which may be wired more economically than two enclosures.

Enclosures containing both a manually operated switch and motor starters together with other electrical devices as will be described, are commonly known as combination starters. It is to be appreciated that because of the many different motor control requirements, combination starters will exist in a large variety of sizes and include a great number of different types of components. In addition to the manually operated switch and the magnetically operated switch, commonly known as contactors, combination starters are provided with devices known as overload relays. The overload relays are connected to be responsive to current flow in the motor circuit and are arranged to interrupt the circuit to the energizing coil of the magnetically operated switch when the motor is subjected to excess current as may be caused by a mechanical overload on the motor. The combination of a contactor and an overload relay in the manner described is commonly known as a starter. Also, because under extreme short circuit conditions the starter may be inadequate to interrupt the motor circuits, fuses are included within the combination starter enclosure. And finally, for reasons of safety and convenience, combination starters frequently are provided with transformers so the control circuit for the energizing coil of the magnetically operated switch may operate at a lower voltage than the line voltage which is supplied to the motor and external lights in the vicinity of the machine driven by the motor may be supplied with an acceptable voltage.

The fuse block and the mounting therefor as disclosed herein is particularly suited for inclusion in a combination starter enclosure and may be used with a large variety of different sized fuses of different types and is arranged to support a transformer in the enclosure so the fuse block and transformer occupy the same panel area without decreasing the accessibility of the fuses carried by the block.

It is an object of the present invention to provide a fuse block, a transformer and a mounting for the fuse block and transformer which will permit the transformer and the fuse block to occupy the same area on a mounting panel without decreasing the accessibility of the fuses carried by the block.

An additional object is to provide an assembly of electrical components which includes a fuse block, a transformer and a mounting for the fuse block and the transformer which will permit the fuse block to be used with various sized fuses of different types and with or without transformers of different sizes without increasing the area on a panel when the fuse block and the transformer are mounted on a panel or decreasing the accessibility of the fuses.

An additional object is to provide an assembly of electrical components which includes a fuse block, a transformer and a mounting for the fuse block and the transformer which will permit the fuse block to be used with various sized fuses of different types and with or without transformers of different sizes without increasing the area on a panel when the fuse block and the transformer are mounted on a panel or decreasing the accessibility of the fuses and to provide the mounting with means for guiding screws for securing the fuse block in position on the panel when the fuse block is secured to the panel without a transformer.

A further object is to provide an assembly of electrical components which includes a transformer, an insulating block providing a mounting for a plurality of fuses of different types and sizes and a pair of supports, wherein the supports are securable on a mounting panel in either of two positions so the transformer may be mounted on the supports and the block mounted on the transformer when the supports are in one position and the block may be mounted on the supports in spaced relation to the panel when the supports are in the other of the two positions so a transformer may or may not be secured to the panel in the space between the blocks and the panel.

Further objects and features of the invention will be readily apparent to those skilled in the art from the specification and appended drawings illustrating certain preferred embodiments in which.

Figure 1:
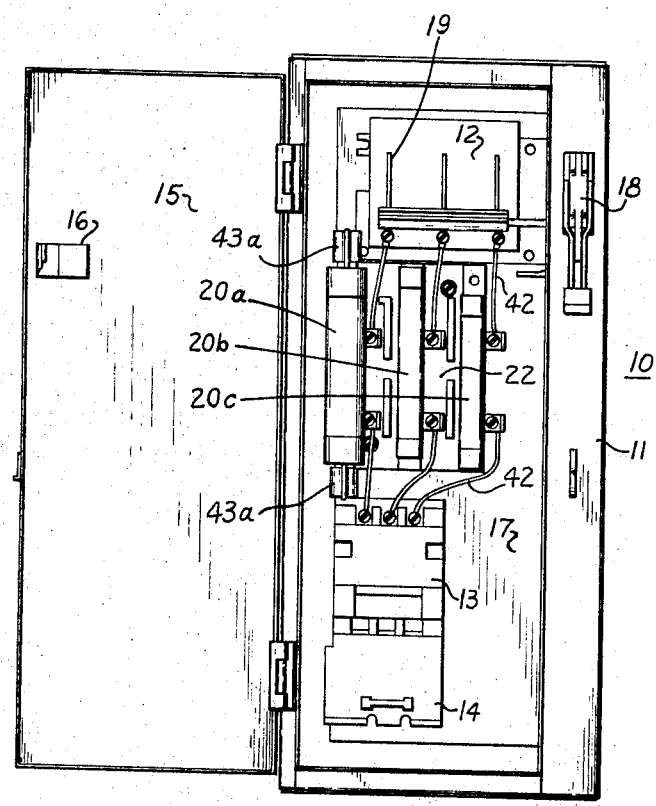
FIG. 1 is a front elevation of a switch cabinet with the door open to expose the components including a fuse mounting structure embodying a preferred form of our invention.

In FIG. 1 of the drawings, a device, known as a combination starter 10, includes an enclosure 11 which houses a manually operated switch 12, known as a disconnect switch, a magnetically operated switch 13, known as a contactor, and a device, known as an overload relay 14. The enclosure 10 may be of the type disclosed in the United States Patent 3,059,072 which was filed on Aug. 17, 1960, and issued Oct. 16, 1962, to Earl F. Mekelburg et al. As disclosed in the Mekelburg patent, the enclosure 10 includes an open cavity which is closed by a door 15 having a door locking mechanism 16. Secured on a rear wall of the enclosure is a removable panel 17 whereon the switches 12 and 13 and the relay 14 are mounted.

As disclosed in the Mekelburg patent, the enclosure 11 may also be provided with an externally accessible operating mechanism 18 for actuating the manually operated switch 12. The switch 12 may be of any suitable type of switch, for example, of the type shown in United States Patent 2,654,011 which issued on Sept. 29, 1953, to Ralph H. Kingdon. As shown in the Kingdon patent, the switch 12 includes a plurality of movable contacts 19 which are actuated by the handle mechanism 18 to effect closing of an electric circuit to the switch 13 and overload relay 14, and an arrangement whereby the switch 12 provides a mounting for suitable clips which receive one of the electrical conducting ends of cartridge type fuses of the type indicated by the numerals 20a, 20b and 20c in FIG. 1. When this arrangement is used the other conducting end of the fuses are received in similar clips which are carried by a separate insulating base that is mounted on the panel 17 between the switches 12 and 13. The switch 13 and the overload relay 14 may be of any suitable type and when combined as illustrated in FIG. 1 from a motor starter and may be of the types disclosed respectively in an application for patent, Ser. No. 473,299, filed July 20, 1965, bearing the names of the inventors Joseph J. Gribble, Kenneth J. Marien and Harold E. Whiting, and in application Ser. No. 327,952 filed Dec. 4, 1963, bearing the names of the inventors Don J. Arneberg, Harold E. Whiting and Merlin Y. Turnbull, both of which applications have been assigned by the inventors to the assignee of the present invention.

Combination starters frequently are used to control the energization of electric motors which require a relatively high voltage supply, e.g., 600 volts, and, as it is frequently desirable for reasons of safety, to control the operation of the switch 13 at a lesser voltage than that required to operate the electric motor, e.g., 120 volts. To satisfy this requirement, combination starters are provided with a suitable transformer to reduce the voltage supplied to the electromagnetic coil of the switch 13. When this arrangement is used, a primary winding of the transformer is connected in the main energizing circuit through switch 12 and the secondary winding of the transformer is connected through a suitable manually operated switch, not shown, to control the energization of the magnetic coil of the switch 13. Additionally, as the transformer may be reqired to supply an external lighting system for a machine which is associated with the combination starter 10, the foregoing arrangement will require that a variety of different size transformers be included in the combination starter enclosure. Further, because of the wide variety of current ratings of the motors which are controlled by the combination starter, a wide variety of fuses having different ratings also are used. This latter feature is illustrated in FIG. 1, wherein three different size fuses are included. It is to be appreciated that the illustrated arrangement of different size fuses will not be used, as in any particular installation each of the fuses will be of identical size.

Figure 3:
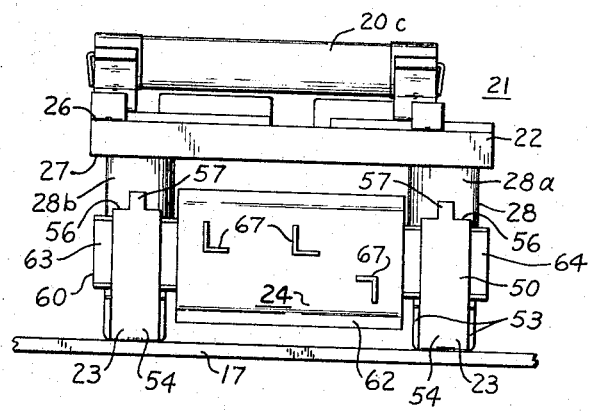
FIG. 3 is a side elevational view of the structure in FIG. 1 taken in the direction of arrows 3—3 in FIG. 2.
Figure 4:
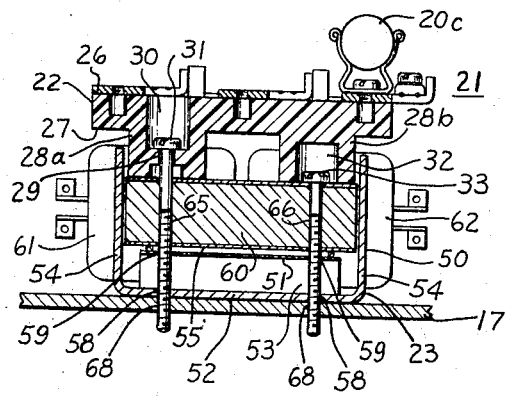
FIG. 4 is a cross-sectional view taken along line 4—4 in FIG. 2.
Figure 5:
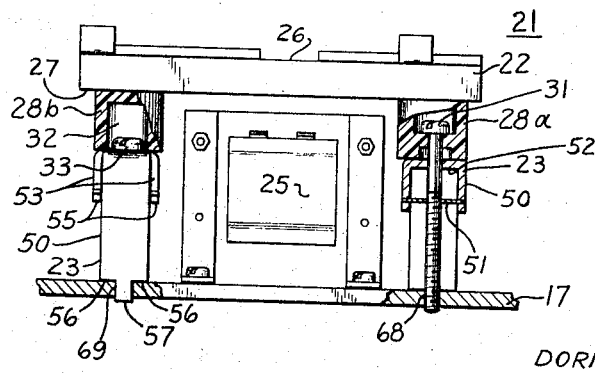
FIG. 5 is a view illustrating the structure in FIG. 3 as used with a smaller size transformer and showing a portion of the structure broken away to illustrate the arrangement for attaching the structure to a panel.

The present invention is related to an assembly of electrical components 21 which, as shown in FIGS. 3–5, includes a molded insulating block 22 which provides a mounting for any one of a plurality of different size fuses shown in FIG. 1 by the numerals 20a, b, and c, and a pair of supports 23 which are securable to the mounting panels 17 in either of two positions so that the block 22 may be mounted directly on a transformer 24 as shown in FIG. 3, or in spaced relation to the panel as shown in FIG. 5. When the arrangement in FIG. 5 is used, a transformer 25 which has a smaller size than that shown in FIG. 3, may be positioned in the space between the fuse block 22 and the panel 17.

The block 22, which is generally rectangular in configuration, has a top surface 26 and a bottom surface 27. Extending downwardly of the bottom surface 27 adjacent each of the four corners of the block 22 are mounting bosses 28. The block 22 also is provided with a pair of bores 29 which extend from the top surface 26 through the block and two of the bosses 28, designated as 28a, which are located at one pair of diagonally opposite corners of the block 22. Extending downwardly from the top surface 26 in alignment with the bores 29 are counterbores 30 which will provide the necessary electrical clearance between the heads of a pair of mounting screws 31 and the current carrying members on the top surface 26. Extending upwardly from the bottom surface of the remaining two bosses 28, designated as 28b, which are located at the remaining corners of the other diagonal of the block 22, are bores 32 which provide clearance for the heads of a second pair of mounting screws 33.

Figure 2:
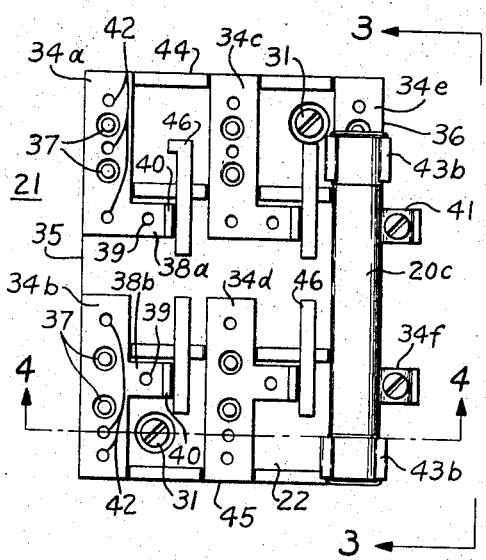
FIG. 2 is a front view of the fuse mounting structure as detached from the cabinet shown in FIG. 1.

Secured on the top surface 26 are a plurality of fuse clip mounting connectors which are designated in FIG. 2 as 34a, 34b, 34c, 34d, 34e, and 34f. The connectors 34a, 34c and 34e are identical. Similarly, the connectors 34b, 34d and 34f are identical. The connectors are mounted as pairs on the top surface 26 with the connectors 34a and 34b forming one pair located adjacent a side edge 35 of the block 22 and the paired connectors 34e and 34f adjacent the remaining side edge 36. The connectors 34c and 34d which form the remaining pair are positioned intermediate the side edges 35 and 36.

Each of the connectors 34a–f is secured to the top surface 26. The particular securing means shown includes rivets designated by the numeral 37 which extend through properly located openings in the connectors 34a–f and the block 22. Each of the connectors further have a laterally projecting portion which on the connectors 34a, c and e extends as a portion 38a from the bottom edge and on the connectors 34b, d and f extends as a portion 38b from the central portion of the connectors. The portions 38a and 38b each have a threaded opening 39 which is spaced from an upwardly turned portion 40 so as to position a wire clamping member and screw 41 which will permit the wires 42 from the switches 12 and 13 to be connected to the connectors 34a–f in the manner illustrated in FIG. 1. The respective pairs of connectors 34a–f, e.g., connectors 34a and 34b, each have a plurality of threaded openings 42 which are located at predetermined spaced intervals along an axis parallel to the sidewalls 35 to permit the securement of fuse retaining clips. Thus if a fuse of small size is to be positioned between the connectors 34a and 34b, the openings 42 closest to the center of the block between the end walls 44 and 45 will be used. As the size of the fuse is progressively increased, the openings 42 progressively spaced toward the end walls 44 and 45 may be used so that a wide variety of fuses of different sizes may be positioned on the block 22. Additionally, the openings 42 may be used to attach fuse clips of the type indicated by the numeral 43a which will receive the blade-like ends extending from the fuse 20a or may be of the conventional resilient arm type 43b as shown in FIG. 2, which will receive the cylindrical end of a fuse. Additionally, the threaded openings 39 may be used to either position pressure wire type connectors which include the clamping member 41, as illustrated in FIGS. 1 and 2, or a conventional box lug type, not shown. The ribs 46 which extend upwardly from the top surface 26 are employed to provide the necessary electrical clearance between the current carrying parts positioned on the top surface, 26.

Each of the supports 23 is formed of a pair of metal parts indicated as parts 50 and 51. The part 50 is formed to have a generally rectangularly shaped base 52 with a pair of spaced parallel arms 53 extending in the same direction from the margins of the opposite side edges of the base 52 and a pair of spaced parallel legs 54 extending from the opposite ends of the base 52 in the same direction as the arms 53. Each of the arms 53 has a free end providing an edge 55 which extends in a plane spaced and parallel to the base 52. Similarly, each of the legs 54 has an edge 56 disposed in a plane parallel to the base 52 and spaced a greater distance from the base 52 than the plane extending through the edges 55. Additionally, each of the legs 54 has a projection 57 which projects beyond the edges 56. The base 52 also has a pair of openings 58 which are spaced to be in alignment with the center of the bores 29 and 32 in the bosses 28a and 28b. The part 51 which serves as a guiding means for screws 31 and 33 is formed of a metal part which is secured to the top edges 55, as by staking, and has a pair of openings 59 which are aligned vertically with the openings 58.

As shown in FIGS. 3 and 4, the transformer 24 is provided with a rectangular shaped core 60 on which a pair of wound wire coils 61 and 62 are positioned. The coils 61 and 62 are each sized to be received between the bosses 28a and 28b and the core 60 is sized to provide end portions 63 and 64 on which the bottom surfaces of the bosses 28a and 28b rest when the block 22 and the transformer 24 are assembled as in FIGS. 3 and 4. The end portions 63 and 64 each are provided with a pair of spaced bores 65 and 66 which are aligned with the vertical center line through the bores 29 and 32. Each of the coils 61 and 62 is provided with suitable terminals 67 which are connected to the coil windings for the purpose of making electrical connections thereto. Additionally, the panel 17 is provided with four threaded openings 68 which are spaced to be aligned with the center lines through the openings 58 in the support part 50 and if desired, four slots 69 which will receive the projections 57 on the legs when the supports 23 are positioned as shown in FIG. 5.

When the components are assembled as shown in FIGS. 3 and 4, the supports 23 are positioned on the end portions 63 and 64 of the core 60 with the core engaging the edges 55 and the legs 54 embracing the outer surfaces of the end portions 63 and 64. The screws 33 are then inserted into openings 66 at the opposite corners of the end portions 63 and 64 to extend through the openings 59 in the part 51 so as to be guided thereby and through openings 58 of the part 50. When this assembly is completed and the screws 33 are tightened into openings 68 of the panel 17. the transformer 24 and the supports 23 will be secured to the panel 17. After the foregoing assembly is completed, the block 22, on which the fuse clips 43a or 43b and the proper fuses associated therewith preferably have been previously attached, is positioned so that the mounting bosses 28 engage the end portions 63 and 64. The screws 31 are then inserted through the bores 29 and the bores 65 and bores 63 and the openings 59 and 58 in the parts 51 and 50 to be threaded into the remaining openings 68 in the panel 17. It will be seen that upon securement of the screws 31, the transformer 24 will be secured by four screw members consisting of a pair of screws 31 and a pair of screws 33 and the supports 23 will each be secured by a pair of screws 31.

Further, it is apparent that if the assembly should be mounted in position on a vertically disposed panel 17 and it is desired to remove the block 22 from the assembly to obtain access to the transformer 24 for service purposes, the removal of the single pair of screws 31 will not cause the transformer 24 to fall from the vertical panel 17. As the transformer 24 is usually a relatively heavy structure, injury to the person performing the service will thereby be avoided.

When the components are assembled as shown in FIG. 5, the supports 23 are positioned on the panel 17 so that the projections 57 are received in the slots 69 of the panel 17. The screws 33 are then passed through the openings 58 in the part 50 and through the openings 59 in the part 51 and are threaded into the openings 68 in the panel 17. During this operation the openings 59 in the part 51 serve to guide the threaded end of the screw 31 into correct alignment with the openings 68 in the panel 17 so that the foregoing can be acomplished without difficulty. After the supports 23 are thus secured to the panel by the screws 33, the block 22 is positioned so the bottom surface of the bosses 28 rest upon the base 52. The screws 31 are then passed through the openings 29, 65, 59 and 58 to be threaded into the openings 68 in the panel 17 so as to secure the block to the panel. Additionally, if desired, the transformer 25, which is smaller in size than the transformer 24 shown in FIG. 4, may be installed in the space provided by the panel 17 and the block 22, as shown in FIG. 5. Thus the present invention will provide an arrangement whereby the fuses may be mounted on a panel with or without transformers of different sizes without increasing the panel area required by the fuses.

While certain preferred embodiments of the invention have been specifically disclosed, it is understood that the invention is not limited thereto because many variations will be readily apparent to those skilled in the art. The invention, therefore, is to be given the broadest possible protection within the terms of the following claims.

What is claimed is:

1. An assembly of electrical components comprising:
    a mounting panel,
    an insulating block,
    a pair of spaced conducting members secured to a top surface of the block, each of said members having a plurality of spaced threaded openings therein,
    means positioned by selected ones of the plurality of spaced openings for mounting any one of a plurality of different sized cartridge-type fuses on the pair of conducting members,
    and means including a pair of supports selectively positioned on the mounting panel to be spaced a predetermined distance from each other in either of two invertible positions for engaging portions of a core of a transformer and mounting the transformer on the mounting panel in a position wherein the core is spaced from and extends parallel to the panel and the block on the core of the transformer in spaced relation to the supports when the supports are positioned in one of the two invertible positions and the transformer included in the assembly has a rectangularly shaped core having a length greater than the spacing between the supports and for mounting the block in spaced relation to the panel and in engagement with the supports when the supports are positioned at said spaced distance in the other of the said two invertible positions and a transformer having a core length less than the spacing between the supports is included in the assembly and mounted between the space between the block and panel.

2. The combination as recited in claim 1 wherein the mounting panel has a plurality of spaced threaded openings therein and each of the supports has a base with a pair of spaced openings in the base aligned with the threaded openings in the panel and each of the supports includes means for guiding screws for mounting the block on the panel into alignment with the threaded openings in the panel when the supports are positioned in either of the said two positions on the panel.

3. The combination as recited in claim 2 wherein each of the supports includes a pair of parallel arms extending along opposite marginal edges of the base, a pair of parallel legs extending from opposite ends of the base, said arms and legs extending in the same direction from the base to provide edges on the arms and ends on the legs which are spaced from the base, and the means for guiding the mounting screws includes a member carried by the pair of arms providing a pair of spaced openings which are aligned with the pair of spaced openings in the base for guiding the mounting screws into alignment with the threaded openings in the panel.

4. The combination as recited in claim 1 wherein the core of the first mentioned transformer has two pairs of spaced openings therein, each of the supports has a pair of openings therein aligned with the openings of one of the two pairs of openings in the transformer core and the insulating block has a pair of spaced openings aligned with one of the openings of each of the two pairs of openings in the transformer core so the transformer and the pair of supports may be attached to the panel by a first pair of screws and the block, the supports and the transformer may be mounted on the panel by a second pair of screws extending through the aligned openings in the block, the transformer and the supports.

5. The combination as recited in claim 3 wherein the edges on the arms provide a support for the core of the first mentioned transformer core when the supports are in the said one of the said two invertible positions and the edges on the legs engage the panel when the supports are in the said other of the said two invertible positions.

6. The combination as recited in claim 5 wherein the edges of the legs have a projection extending into openings in the panel for positioning the supports on the panel when the supports are in the said other of the two invertible positions.

References Cited
UNITED STATES PATENTS

| | | | |
|---|---|---|---|
| 881,965 | 3/1908 | Sessions | 200—133 |
| 1,325,052 | 12/1919 | Starrett | 317—114 |
| 1,537,999 | 5/1925 | Nelsen | 336—65 |
| 1,778,764 | 10/1930 | Lang | 317—114 |
| 1,953,343 | 4/1934 | Frank | 200—133 |
| 2,007,174 | 7/1935 | Benjamin | 317—114 |
| 2,762,988 | 9/1956 | Pomazac et al. | 336—67 |
| 3,215,899 | 11/1965 | Meacham | 317—119 |

ROBERT K. SCHAEFER, *Primary Examiner.*

ROBERT S. MACON, *Examiner.*

D. SMITH, *Assistant Examiner.*